(12) United States Patent
Curbelo

(10) Patent No.: US 6,921,910 B2
(45) Date of Patent: Jul. 26, 2005

(54) INFRARED SOURCE FOR SPECTROMETERS

(75) Inventor: Raul Curbelo, Lexington, MA (US)

(73) Assignee: Varian Australia PTY LTD, Mulgrave (AU)

( * ) Notice: Subject to any disclaimer, the term of this patent is extended or adjusted under 35 U.S.C. 154(b) by 182 days.

(21) Appl. No.: 10/626,094

(22) Filed: Jul. 24, 2003

(65) Prior Publication Data
US 2004/0217306 A1 Nov. 4, 2004
(Under 37 CFR 1.47)

Related U.S. Application Data
(60) Provisional application No. 60/398,481, filed on Jul. 25, 2002.

(51) Int. Cl.[7] ................................. F21H 5/00
(52) U.S. Cl. .............. 250/504 R; 250/493.1; 219/553
(58) Field of Search .................. 250/504 R, 493.1; 219/553

(56) References Cited

U.S. PATENT DOCUMENTS 4,935,633 A    6/1990    Curbelo et al.

OTHER PUBLICATIONS

Product brochure for Norton 301 (now Saint–Gobain Advanced Ceramics, Inc., New Milford, New Hampshire 03055).

*Primary Examiner*—John R. Lee
*Assistant Examiner*—Zia R. Hashmi
(74) *Attorney, Agent, or Firm*—Philip Braginsky

(57) ABSTRACT

A source for reducing drift of a hot spot by producing infrared (IR) light with an insulating housing; an electrical power supply; first and second resistance elements having first and second resistivities; a third resistance element having a third resistivity; the third resistance element disposed between the first and second resistance elements, with the resistivity of the third resistance element having a value greater than the resistivity of both the first and second resistance elements. Alternatively, the first and second resistance elements can have cross-sectional areas that are greater than that of the third resistance. A method of reducing drift of a hot spot in a radiating element of a source of IR illumination by applying constant polarity substantially constant direct current from the power supply and reversing polarity in less than 24 hours, by a square wave AC source, or a Class E amplifier at constant power.

27 Claims, 8 Drawing Sheets

| FIG. 4A |
| FIG. 4B |

INFRARED SOURCE FOR SPECTROMETERS

CROSS REFERENCE TO RELATED APPLICATIONS

This application claims the benefit of U.S. Provisional Patent Application No. 60/398,481 filed on Jul. 25, 2002.

BACKGROUND OF THE INVENTION

A radiation source often used for spectroscopic work in the infrared takes the form of a rod of suitable electrically resistive material which when heated by the passage of an electric current from end to end emits an infrared continuum in the spectral region for which the spectrophotometer is designed. The luminance of such a source is greatest around the mid-point thereof and tends to drop off at either side of it in a substantially symmetrical manner, as each of the two end terminals is approached.

The effect due to the thermal loading imposed by the terminals, can be minimized by having a comparatively long rod and using as the effective source a small medial segment away from the terminals. However, even at the limit of this approach that is acceptable in practice, the source is still marred by a central hot spot.

Wire-wound source elements in the references have very limited life due to oxidation of the metal wires at high temperature, which leads to failure when the wire burns out.

Large igniter elements typically require about 100 watts of power and, for spectroscopy applications, must be enclosed in a water cooled housing with a small aperture to limit the power that reaches the spectrometer components.

Small igniters, such as the Norton 301(now Saint-Gobain Advanced Ceramics, Inc., New Milford, N.H. 03055), typically require less than 20 watts, and can be used with an insulating housing that defines the aperture seen by the spectrometer optics, and typically do not require water cooling.

As illustrated in FIG. 1, prior art IR source 100 has an insulating housing 108 that surrounds lead wires 102 and 104, which are electrically coupled to, and supplied power from, a DC power supply or drive source 106 so that the lead wire 102 is a ground or negative lead while the lead wire 104 is a positive connection. The lead wires 102 and 104 are electrically coupled at junctions 122 and 124, respectively, to a resistance element that is formed of two support legs 112 and 114 and a radiating area or element 116 that is manufactured with a resistivity higher than that of the support legs 112 and 114. This configuration allows small power dissipation in the support legs 112 and 114 due to the drive current, and at the same time provides thermal insulation of the radiating element 116 from the support legs 112 and 114 that are at much lower temperature. The support leg 114 is therefore coupled to the positive (+) terminal of the DC power supply 106 while the support leg 112 is coupled to the negative (−) terminal of the DC power supply 106.

To provide a very stable output, the source 100 must be driven by a well-regulated current, so that the DC power supply 106 must be a precision power supply.

For optimal operation of the spectrometer, the optics that collect the source radiation are designed to focus only the high temperature spot of the source, otherwise the effective temperature illuminating the spectrometer field of view would be the average of the source temperatures in the total area observed.

The support legs 112 and 114 are built approximately symmetrical, and the hot spot 118, the highest temperature area, is centered between the two support legs 112 and 114 within the radiating element 116 as indicated in FIG. 1.

In a large percentage of these elements, the hot spot 118 drifts as a function of operating life: first to a position upstream along the positive element 114 and later, after a few thousand hours of operation, well short of the total life of the element, to a position further upstream. For a high performance spectrometer, the optics focus only on the hot spot of the source element, and the drift that occurs would require that the optical alignment be adjusted periodically to maintain optimum performance, which is not acceptable for a user. The alternative is for the spectrometer optics to collect light from a much larger area of the source element, but that makes the effective temperature of the source much lower and therefore reduces the sensitivity of the spectrometer.

As shown in FIG. 1, the source element 100 is made with materials of different resistivity to restrict the hot spot 118 to approximately the middle of the radiating element 116. The problem of hot spot drift occurs when a DC current is applied to the radiating element 116 in order to bring it to a high temperature. The combination of the high current and the high temperature produce a drift of the high resistivity area towards the positive support leg 114. A better approach to solve the foregoing problems is to provide a method that eliminates the position drift of the hot spot of the source.

SUMMARY OF THE INVENTION

This invention provides an apparatus and a method for eliminating the position drift of the hot spot of the source.

The present invention is directed to a source for producing infrared (IR) light, said IR source comprising: an insulating housing; current carrying means capable of carrying electrical current; at least a first and second resistance elements having a first and second resistivity, respectively; and a third resistance element having a third resistivity. The current carrying means is electrically coupled to the first and second resistance elements to form at least a first electrical coupling between the current carrying means and the first resistance element and to form at least a second electrical coupling between the current carrying means and the second resistance element. The insulating housing is disposed to insulate the first and second electrical couplings from an environment. The first resistance element is electrically coupled to the third resistance element, the second resistance element electrically coupled to the third resistance element, the third resistance element disposed between the first and second resistance elements, and the third resistivity of the third resistance element has a value greater than the first resistivity of the first resistance element and the second resistivity of the second resistance element.

In a second embodiment of the present invention, a source for producing infrared (IR) light comprises: an insulating housing; current carrying means capable of carrying electrical current; at least a first and second resistance elements having a first and second resistivity, respectively; and a third resistance element having a third resistivity. The current carrying means is electrically coupled to the first and second resistance elements to form at least a first electrical coupling between the current carrying means and the first resistance element and to form at least a second electrical coupling between the current carrying means and the second resistance element. The insulating housing is disposed to insulate the first and second electrical couplings from an environment; the first resistance element electrically coupled to the third resistance element; and the second resistance element is electrically coupled to the third resistance element. The third resistance element overlaps an end of the first resistance element and an end of the second resistance element, and the third resistivity of the third resistance element has a value equal to that of the first resistivity of the first resistance element and to that of the second resistivity of the second resistance element. The first resistance element has a cross-sectional area transverse to a longitudinal axis of the first resistance element; the second resistance element has a cross-sectional area transverse to a longitudinal axis of the second resistance element; and the third resistance element has a cross-sectional area transverse to a longitudinal axis of the third resistance element. The cross-sectional area of the third resistance element is less than the cross-sectional area of the first resistance element and the cross-sectional area of the second resistance element. The cross-sectional area of the first resistance element, the second resistance element and the third resistance element are comprised of a dimension width and thickness. The width of the third resistance element is less than the width of the first and second resistance elements. Alternatively, the thickness of the third resistance element is less than the thickness of the first resistance element and the second resistance element.

At least one of the first, second and third resistance elements has a cross-section of at least one of a linear and a curvilinear shape. The cross-section is at least one of a rectangle, a circle, an ellipse and a polygon other than a rectangle.

Since the first, second and third resistance elements and the current carrying means are electrically coupled, the IR source further comprises a power supply electrically coupled to the current carrying means. The third resistance element can be characterized by a thermal time constant for an operating temperature consistent with operating requirements of the spectrometer and the power supply can apply an AC square wave voltage across the third radiating element at a frequency greater than the inverse of the thermal time constant. The power supply can be also a class E amplifier electrically coupled to the current carrying means, typically so as to provide an approximately constant power output.

The present invention is directed also to a method of reducing drift of a hot spot in a radiating element of a source of infra-red (IR) illumination. The radiating element is electrically coupled to a power supply. The method comprises the steps of: (a) applying a constant polarity substantially constant direct current from the power supply to the radiating element for a period less than 24 hours; and (b)reversing polarity of the direct current to the radiating element for a subsequent application of direct current, the reversal of polarity occurring at a particular frequency $f_{ps}$. The frequency of reversal $f_{ps}$ is greater than once every 24 hours but less than once per duration of a scan by a Fourier Transform Infra-Red (FTIR) spectrometer using IR light produced by the radiating element. A sample being scanned by the FTIR spectrometer produces at least one signal at a particular frequency of modulation $f_m$ and the frequency is greater than the greatest frequency component resulting from the reversal frequency $f_{ps}$. The resistance element is characterized by a thermal time constant for an operating temperature consistent with operating requirements of the spectrometer and the period is selected by the further step of: (c1) applying a frequency of reversal of the polarity of the power source, $f_{ps}$ which is greater than the inverse of thermal time constant $\tau_e$ of the radiating source element. The frequency of reversal of the power source is on the order of $10^4$ times or greater than the inverse of the thermal time constant of the third resistive. Alternatively, the frequency is selected by the further step of:

(c1') applying a frequency of reversal of the polarity of the power source $f_{ps}$ such that the thermal time constant $\tau_e$ of the radiating source produces a frequency in the illumination provided by the IR source that is outside the range of frequencies generated by the FTIR scan. The power supply applies an AC square wave voltage across the third radiating element at a frequency greater than the inverse of the thermal time constant. Alternatively, the power supply provides a periodic voltage of constant amplitude and frequency $f_{ps}$.

Another alternative is a class E amplifier, which can provide an approximately constant power output at the frequency $f_{ps}$.

BRIEF DESCRIPTION OF THE DRAWINGS

FIG. 3A-1 is an elevation view of the second embodiment of the present invention.

FIG. 3A-2 is a side elevation view of the second embodiment of the present invention of FIG. 3A-1.

FIG. 3B-1 is a top view of a variation of the second embodiment of the present invention of FIGS. 3A-1 and 3A-2.

FIG. 3B-2 is a rear elevation view of the variation of the second embodiment of the present invention of FIG. 3B-1.

FIG. 3B-3 is a side elevation view of the variation of the second embodiment of the present invention of FIG. 3B-1.

DETAILED DESCRIPTION OF EXEMPLARY EMBODIMENTS

Figure 2:
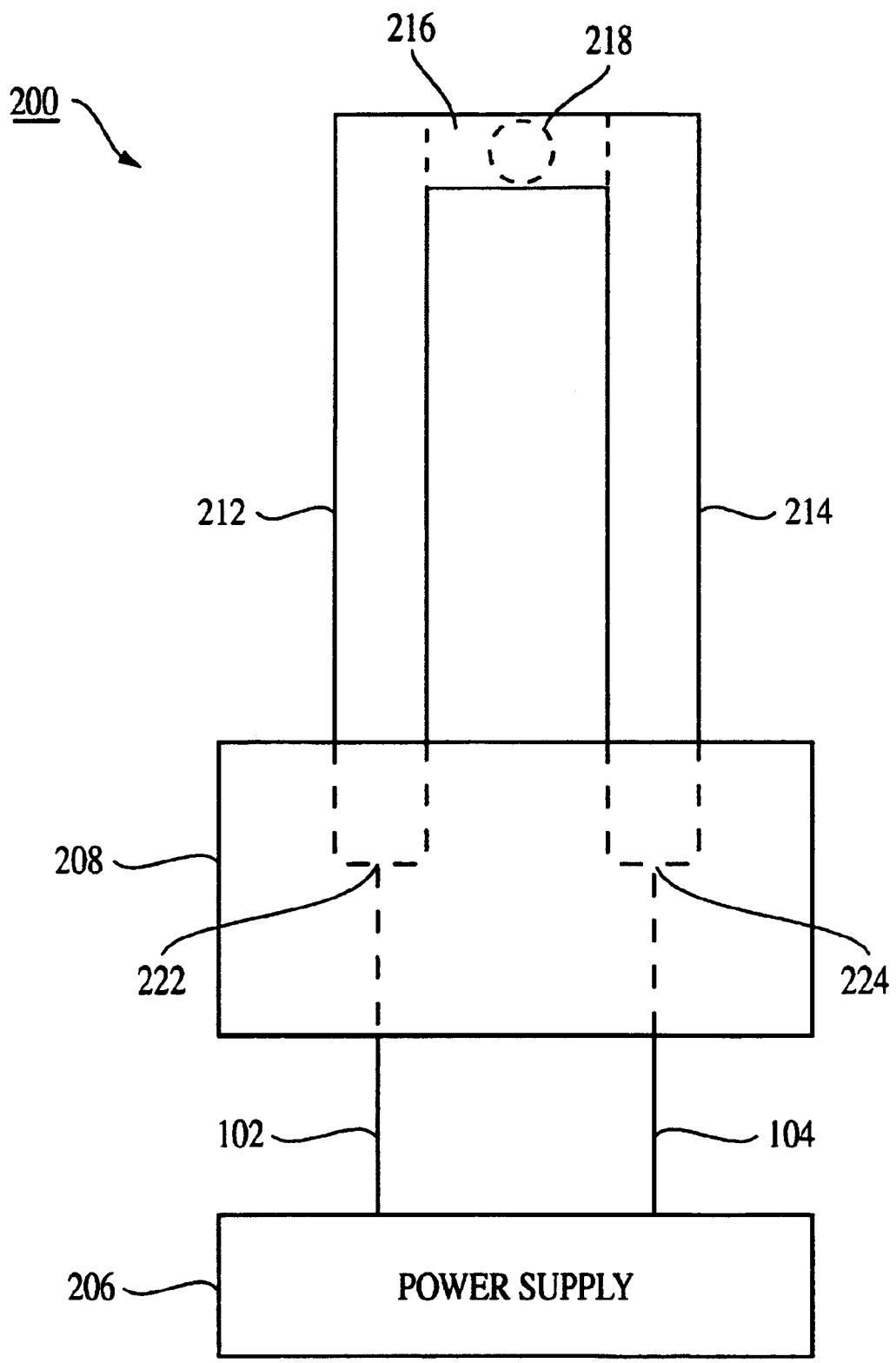
FIG. 2 is an elevation view of the first embodiment of the present invention.

FIG. 2 illustrates the first embodiment of the present invention. Lead wires 102 and 104 are electrically coupled to a power supply 206 and also to support legs 212 and 214 at connections 222 and 224, respectively. A high resistivity zone is limited to the center of the radiating element 216 at the top of the IR source 200. This configuration reduces drift of the hot spot 218 because the temperature next to the hot spot 218 is lower due to the lower resistivity in the adjoining support legs 212 and 214.

Figure 1:
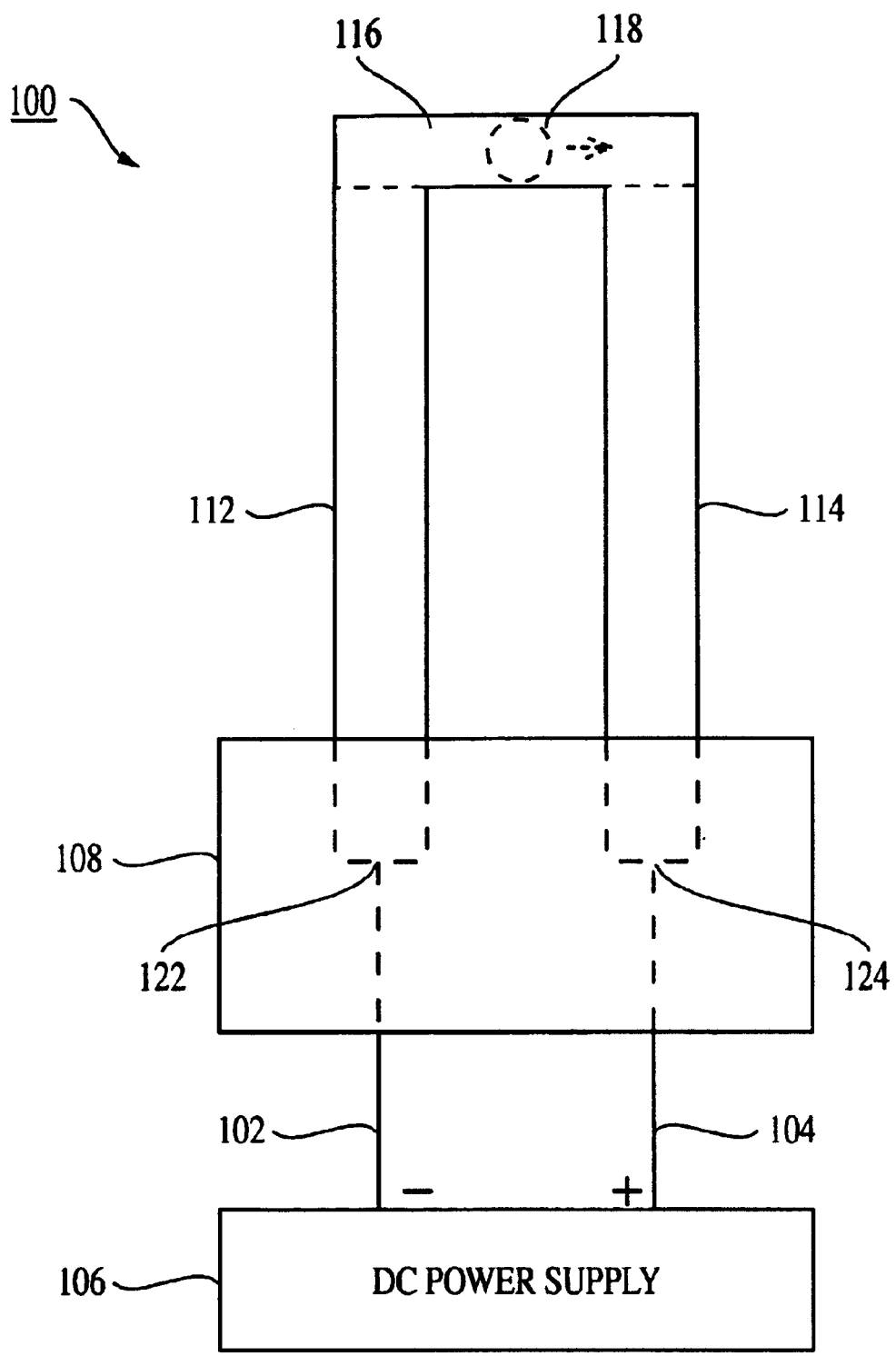
FIG. 1 is an elevation view of an IR source of the prior art for an FTIR spectrometer.
Figures 1, 3A:
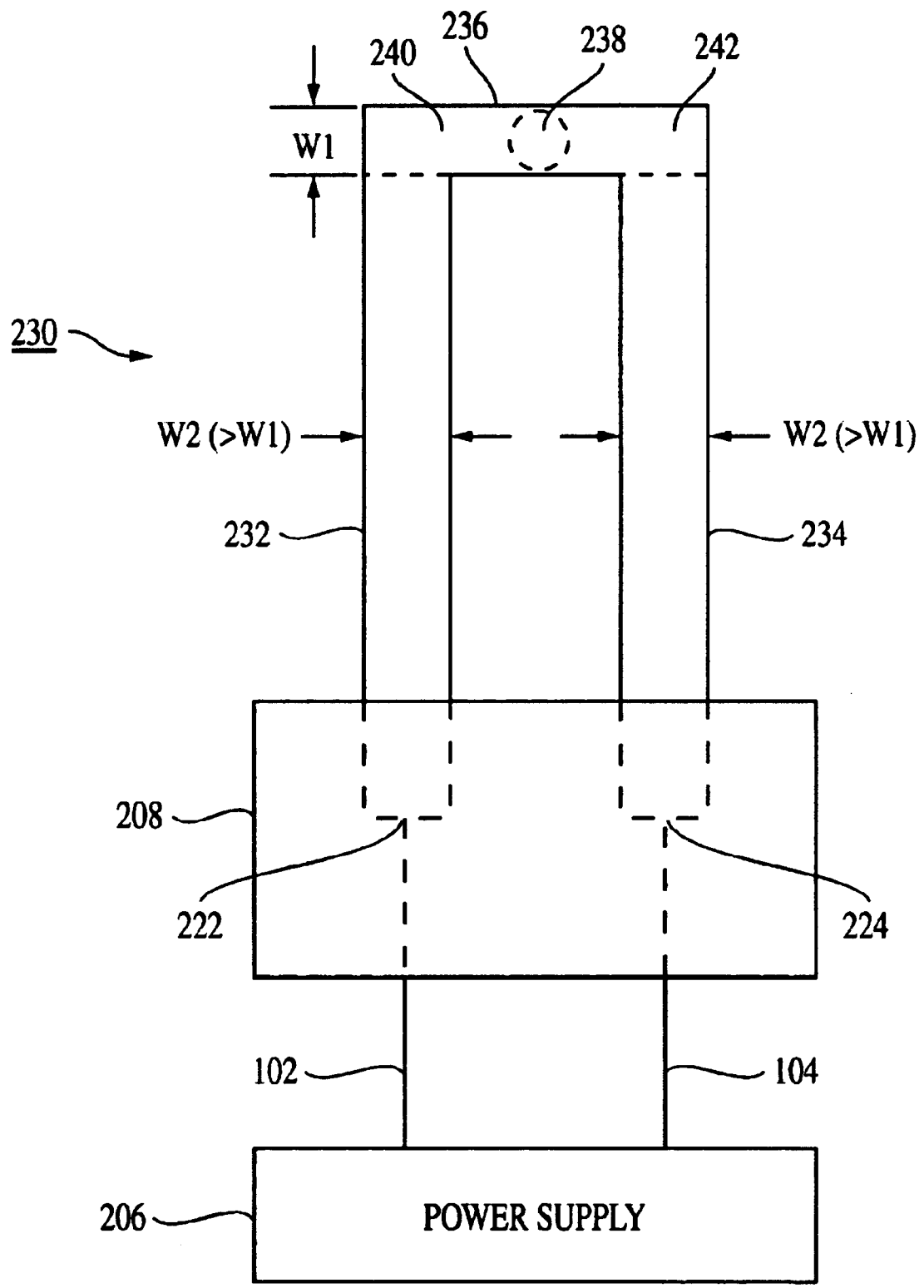
Figures 2, 3A:
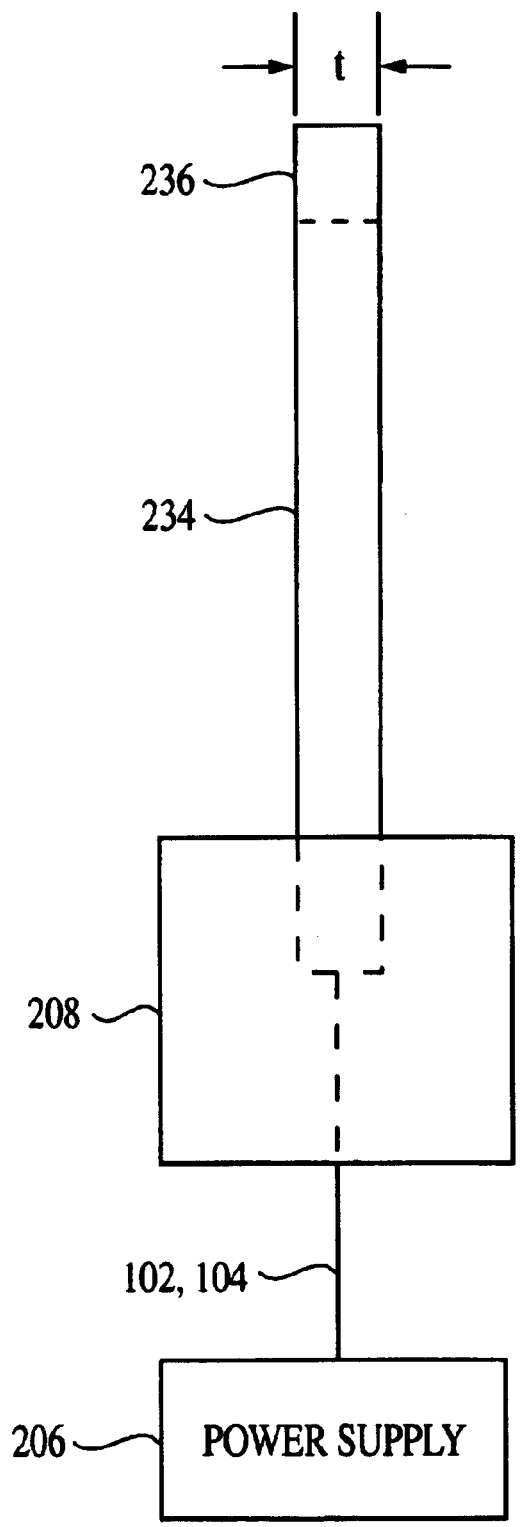

FIGS. 3A-1 and 3A-2 illustrate the second embodiment of the present invention. Here the support legs 232 and 234 of IR source 230 are made to have a width W2 which is wider than the width W1 of the radiating element 236. Typically, the thicknesses t of the support legs 232 and 234 and the radiating element 236 are equal to each other. The thickness t is less than the width W1 or W2 and typically is in the range of 1 mm, as shown in FIG. 3A1. Therefore, the cross-sectional area A1 (=W1×t) is less than the cross-sectional area A2 (=W2×t). In this configuration, the resistivities of the support legs 232 and 234 can be equal to the resistivity of the radiating element 236. Therefore, because of the differences in cross-sectional areas, as compared to the current density in the radiating element 236, this configuration reduces the current density in the legs 232 and 234, including in the region of the corners 240 and 242. Therefore the temperature next to the hot spot 238 is reduced so as to reduce drift.

Figures 1, 3B:
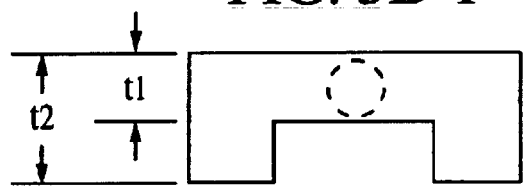
Figures 2, 3B:
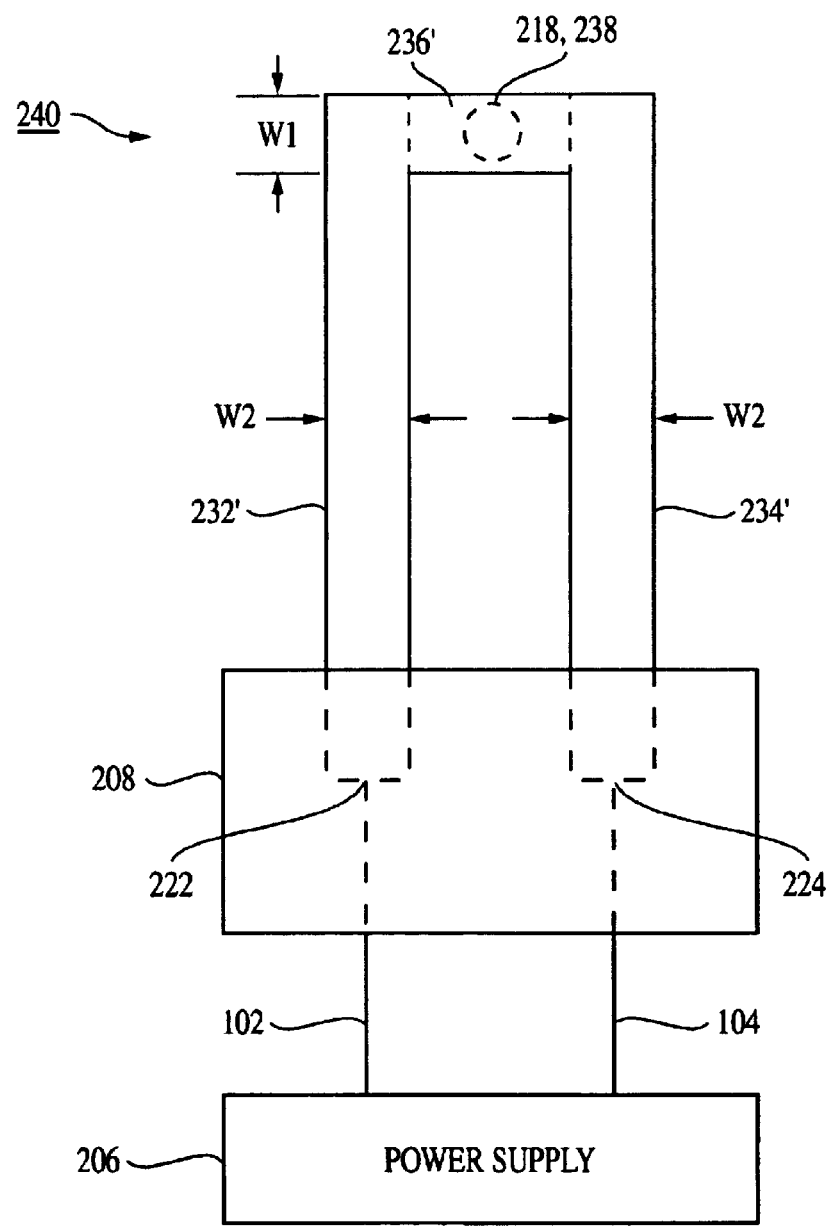
Figures 3, 3B:
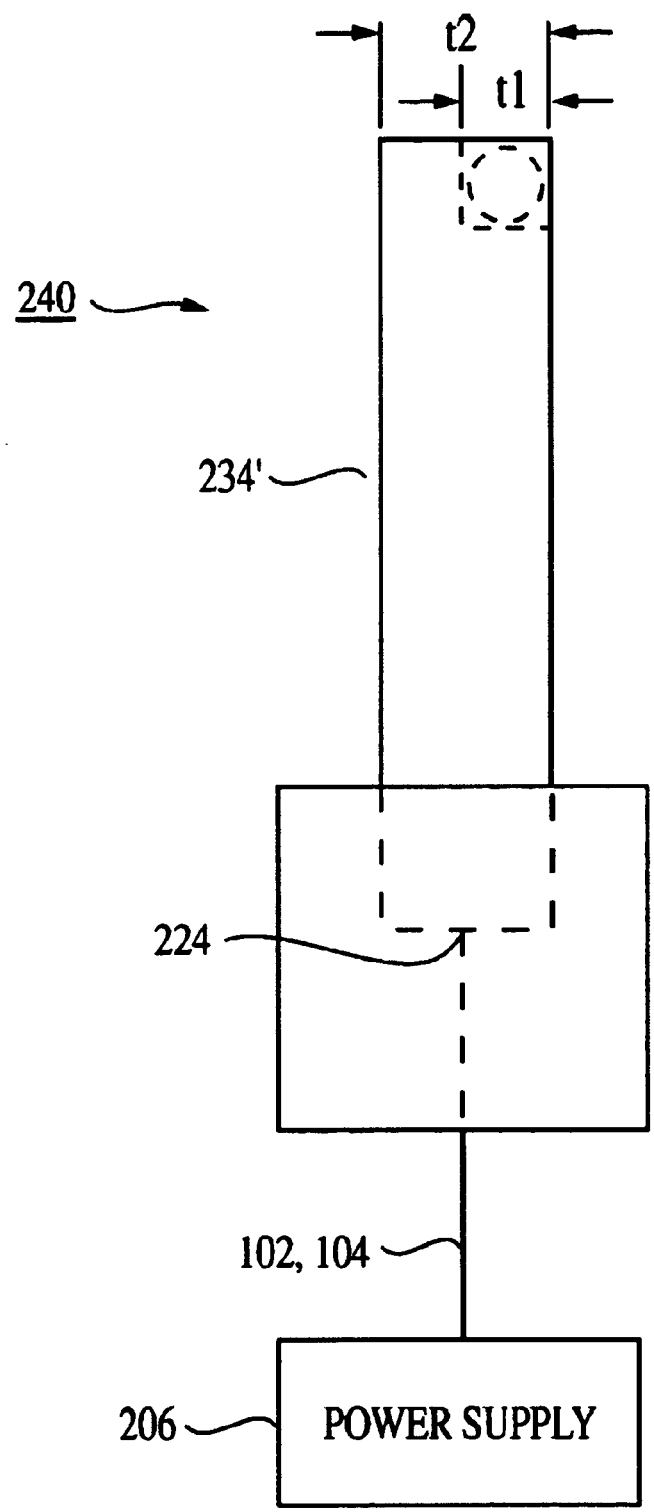

FIGS. 3B-1, 3B-2, and 3B-3 illustrate a variation of the second embodiment of the present invention of FIG. 3A. FIG. 3B-1 is a top view, FIG. 3B-2 is a rear elevation view, and FIG. 3B-3 is a side elevation view. In this variation, the radiating element support legs 232' and 234' have a thickness t2 which is greater than the thickness t1 of the radiating element 236'. Therefore, the cross-sectional area A2' (=W2× t2) is greater than the cross-sectional area of the center of the radiating element 236' which has a cross-sectional area A1' (=W1=t1), even if W1=W2. Since the resistivities of the support legs 232' and 234' are equal or less than the resistivity of the radiating element 236', again the current density in the support legs 232' and 234' is reduced as compared to the current density in the radiating element 236'.

Although typically the cross-sections of the radiating elements 232, 234, 236 and 232', 234', 236' are rectangular, the cross-sections can be of any other linear or curvilinear shape such as a circle, an ellipse, a square or other polygon.

In a method of reducing drift of the hot spot, the direction of the DC current from the power supply 206 through the radiating element 216 or 236 is changed to even out the drift of the hot spot 218 or 238.

In an IR source for use with a FTIR spectrometer, the direction of the DC current from power supply 206 in FIGS. 2, 3A-1 through 3B-3 is reversed periodically at the end of each interferometer scan, or at longer periods, while maintaining a stable current during each scan. The maximum period typically must be less than 24 hours; otherwise the hot spot starts a drift that cannot be reversed using current methods and materials.

Preferably, the current direction is reversed with a frequency $f_{ps}$ greater than the highest electrical frequency of interest in the spectrometer signal. The electrical frequencies of interest are the modulation frequencies $f_m$ of the energy from a constant amount of light input to the interferometer. Also, advantage can be taken of the filter effect of the thermal time constant of the source element by applying a frequency of reversal of the polarity of the power source, $f_{ps}$ ($sec^{-1}$) which is much greater than the inverse of the thermal time constant $\tau_e$ (sec) of the radiating source element. This results in an AC ripple in the source illumination that is undetectable or negligible with respect to the noise level in the spectrometer signal at the ripple frequency, which is the frequency of the power supply, $f_{ps}$. Alternatively, the ripple frequency falls outside the frequencies of interest, even in the case of possible under sampling folding. Those skilled in the art recognize that during the cycle period of the voltage that drives the source, the temperature of the radiating element of the IR source will dip. Therefore, the frequency of reversal of the polarity of the power source, i.e., $f_{ps}$, is chosen to be much greater than the inverse of the thermal time constant $\tau_e$ of the radiating source element to minimize significant dip in the temperature of the IR source radiating element. Typically, the frequency of reversal of the power source is on the order of $10^4$ or greater than the inverse of the thermal time constant of the source.

The driver circuit or power supply 206 for these embodiments can be, but is not limited to, the drive described in U.S. Pat. No. 4,935,633 to Curbelo et al, which is incorporated herein by reference, with the operating frequency of the power supply $f_{ps}$ selected as described above. In this case, the IR source 200 operates at constant amplitude of the AC waveform peak-to-peak voltage $V_{pp}$ to form an AC square wave voltage. The source IR output can drop if the source resistance increases with age.

Figures 4, 4A:
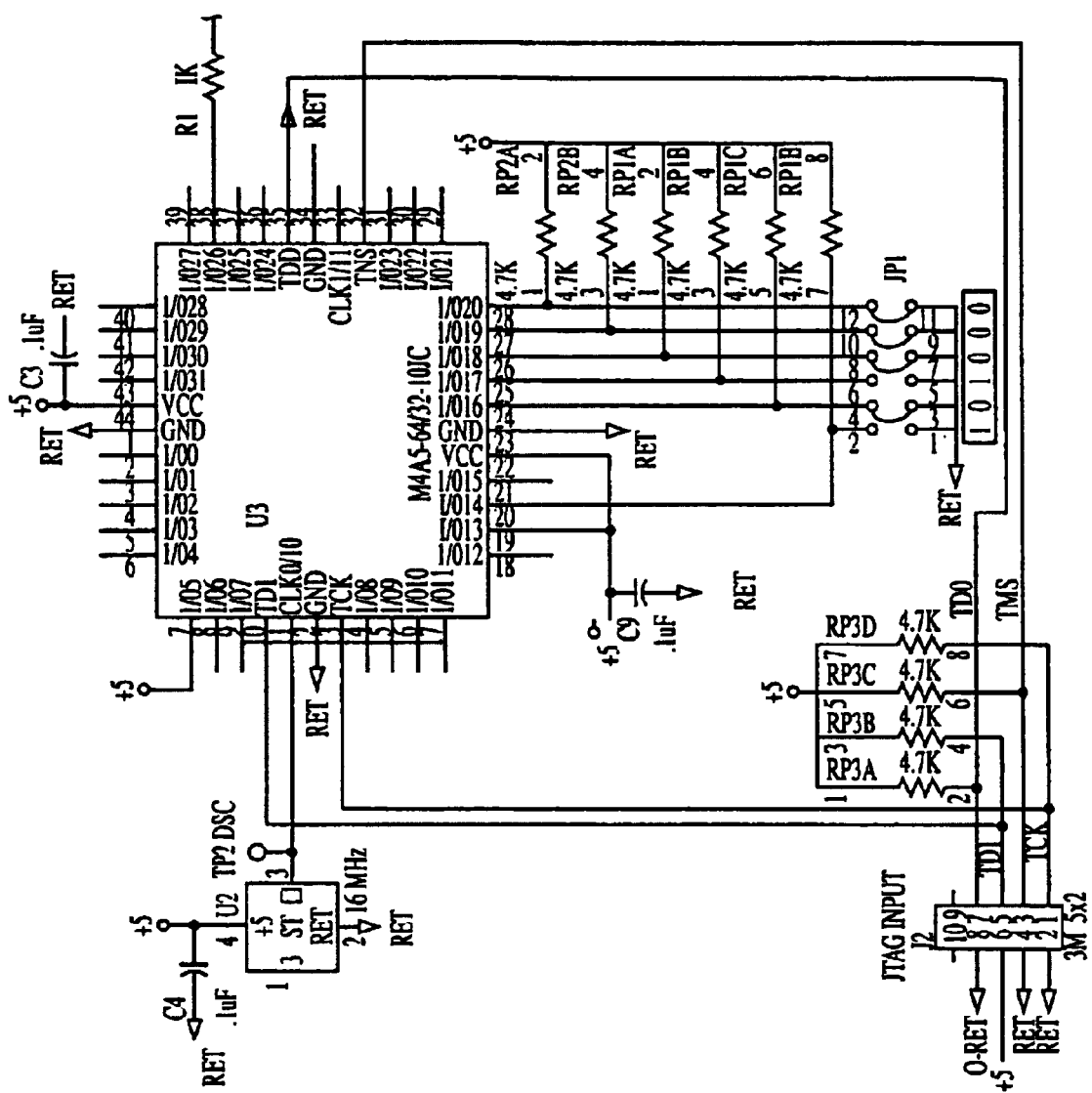
FIG. 4 is a type of power supply of the present invention of FIGS. 3A-1 through 3B-3.
Figure 4B:
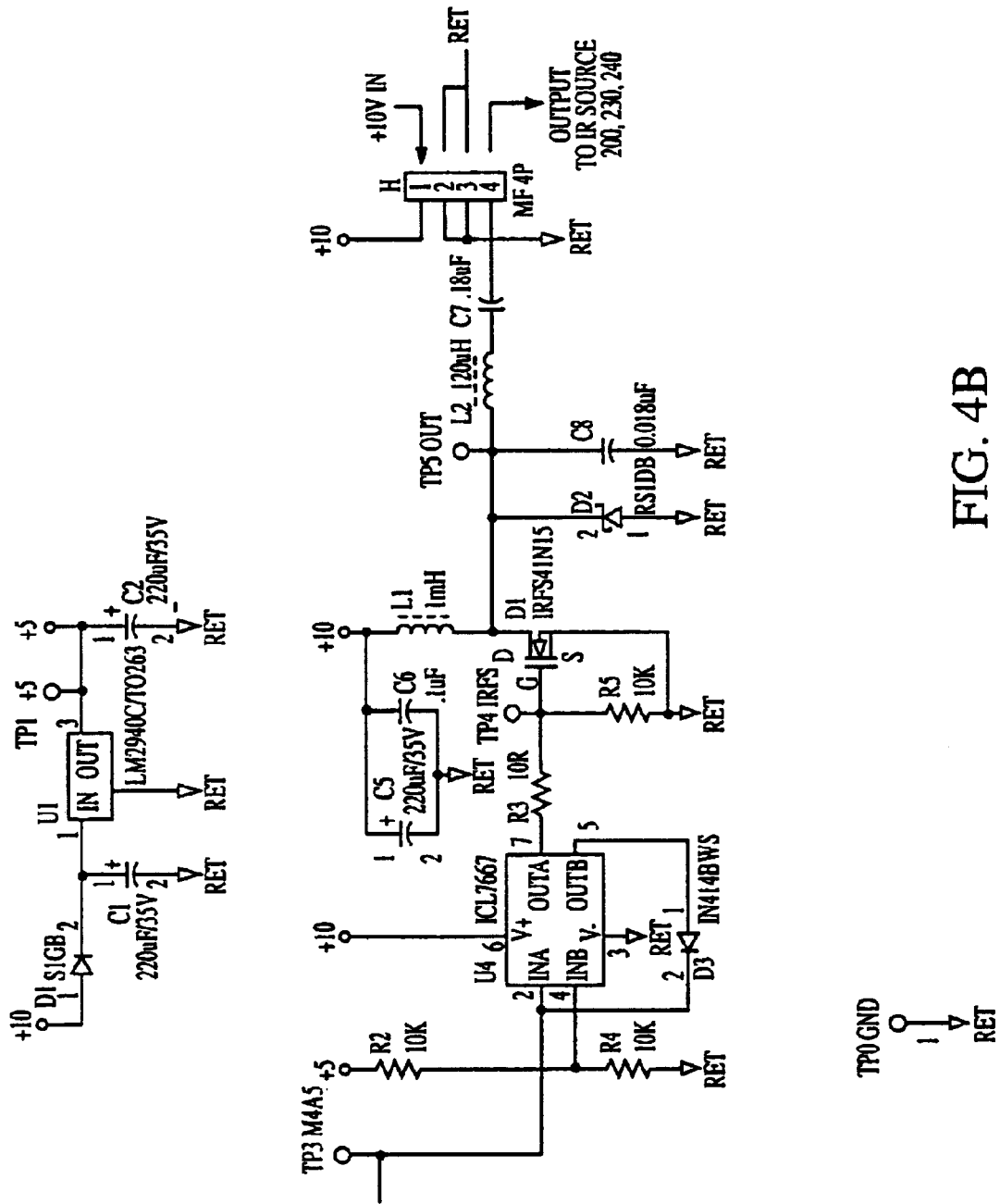

FIG. 4 illustrates another embodiment of the driver circuit which is preferably a class E amplifier driven at a constant frequency $f_{ps}'$ selected as above. The Class E amplifier illustrated in FIG. 4 provides approximately constant power output, as opposed to a constant voltage output, at the potential expense typically of a small reduction of source life.

The invention has now been explained with reference to specific embodiments. Other embodiments will be apparent to those of ordinary skill in the art in view of the foregoing description. It is not intended that this invention be limited except as indicated by the appended claims and their full scope equivalents.

What is claimed is:

1. A source comprising:

an insulating housing;

current carrying means capable of carrying electrical current;

at least a first and second resistance elements having a first and second resistivity, respectively;

a third resistance element having a third resistivity;

said current carrying means being electrically coupled to said first and second resistance elements to form at least a first electrical coupling between said current carrying means and said first resistance element and to form at least a second electrical coupling between said current carrying means and said second resistance element;

said insulating housing disposed to insulate said first and second electrical couplings from an environment;

said first resistance element electrically coupled to said third resistance element;

said second resistance element electrically coupled to said third resistance element;

said third resistance element disposed between said first and second resistance elements, said third resistivity of said third resistance element having a value greater than said first resistivity of said first resistance element and said second resistivity of said second resistance element;

wherein infrared radiation is produced.

2. A light, source comprising:

an insulating housing;

current carrying means capable of carrying electrical current;

at least a first and second resistance elements having a first and second resistivity, respectively, a third resistance element having a third resistivity;

said current carrying means being electrically coupled to said first and second resistance elements to form at least a first electrical coupling between said current carrying means and said first resistance element and to form at least a second electrical coupling between said current carrying means and said second resistance element;

said insulating housing disposed to insulate said first and second electrical couplings from an environment;

said first resistance element electrically coupled to said third resistance element;

said second resistance element electrically coupled to said third resistance element;

said third resistance element overlapping an end of said first resistance element and an end of said second resistance element, said third resistivity of said third resistance element having a value equal to that of said first resistivity of said first resistance element and to that of said second resistivity of said second resistance element;

said first resistance element having a cross-sectional area transverse to a longitudinal axis of said first resistance element;

said second resistance element having a cross-sectional area transverse to a longitudinal axis of said second resistance element;

said third resistance element having a cross-sectional area transverse to a longitudinal axis of said third resistance element, said cross-sectional area of said third resistance element being less than said cross-sectional area of said first resistance element and said cross-sectional area of said second resistance element;

wherein infrared radiation is produced.

3. The light source according to claim 2 wherein:

said cross-sectional area of said first resistance element and of said second resistance element are comprised of a dimension of width and thickness;

said cross-sectional area of said third resistance element is comprised of a dimension of width and thickness; and wherein the width of said third resistance element is less than the width of said first resistance element and of said second resistance element.

4. The light source according to claim 2 wherein:

said cross-sectional area of said first resistance element and of said second resistance element are comprised of a dimension of width and thickness;

said cross-sectional area of said third resistance element is comprised of a dimension of width and thickness; and wherein the thickness of said third resistance element is less than the thickness of said first resistance element and of said second resistance element.

5. The light source according to claim 1, wherein said first, second and third resistance elements and said current carrying means thereby being electrically coupled; and wherein said light source further comprises a power supply electrically coupled to said current carrying means.

6. The light source according to claim 2, wherein said first, second and third resistance elements and said current carrying means thereby being electrically coupled; and wherein said light source further comprises a power supply electrically coupled to said current carrying means.

7. The light source according to claim 5, wherein said third resistance element is characterized by a thermal time constant for an operating temperature consistent with operating requirements of the spectrometer and said power supply applies an AC square wave voltage across said third radiating element at a frequency greater than the inverse of said thermal time constant.

8. The light source according to claim 6, wherein said third resistance element is characterized by a thermal time constant for an operating temperature consistent with operating requirements of the spectrometer and said power supply applies a periodic voltage across said third radiating element at a frequency greater than the inverse of said thermal time constant.

9. The light source according to claim 8, wherein said periodic voltage is a voltage of approximately constant amplitude and frequency across said third radiating element at a frequency greater than the inverse of said thermal time constant.

10. The light source according to claim 9, wherein said periodic voltage is an AC square wave voltage across said third radiating element at a frequency greater than the inverse of said thermal time constant.

11. The light source according to claim 5, wherein said power supply is a class E amplifier electrically coupled to said current carrying means.

12. The light source according to claim 11, wherein said class E amplifier provides an approximately constant power output.

13. The light source according to claim 6, wherein said power supply is a class E amplifier electrically coupled to said current carrying means.

14. The light source according to claim 13, wherein said class E amplifier provides an approximately constant power output.

15. The light source according to claim 1, wherein at least one of said first, second and third resistance elements has a cross-section of at least one of a linear and a curvilinear shape.

16. The light source according to claim 15, wherein said cross-section is at least one of a rectangle, a circle, an ellipse and a polygon other than a rectangle.

17. A method of reducing drift of a hot spot in a radiating element of a source of infra-red (IR) illumination, said radiating element being electrically coupled to a power supply, said method comprising the steps of (a) applying a constant polarity substantially constant direct current from said power supply to said radiating element for a period less than 24 hours;

(b) reversing polarity of the direct current to said radiating element for a subsequent application of direct current, the reversal of polarity occurring at a particular frequency $f_{ps}$.

18. The method according to claim 17, wherein the frequency of reversal $f_{ps}$ is greater than once every 24 hours but less than once per duration of a scan by a Fourier Transform Infra-Red (FTIR) spectrometer using IR light produced by said radiating element.

19. The method according to claim 18, wherein a sample being scanned by the FTIR spectrometer produces at least one signal at a particular frequency of modulation $f_m$ and the frequency is greater than the greatest frequency component resulting from said frequency of reversal $f_{ps}$.

20. The method according to claim 18, wherein said resistance element is characterized by a thermal time constant for an operating temperature consistent with operating requirements of the spectrometer and the period is selected by the further step of:

(c1) applying a frequency of reversal of the polarity of the power source, $f_{ps}$ which is greater than the inverse of thermal time constant $\tau_e$ of the radiating source element.

21. The method according to claim 20, wherein the frequency of reversal of the power source is on the order of $10^4$ times or greater than the inverse of the thermal time constant.

22. The method according to claim 18, wherein said resistance element is characterized by a thermal time constant at an operating temperature consistent with the operating requirements of the spectrometer and the frequency is selected by the further step of:

(c1') applying a frequency of reversal of the polarity of the power source $f_{ps}$ such that the thermal time constant $\tau_e$ of the radiating source produces a frequency in the illumination provided by the IR source that is outside the range of frequencies generating the FTIR scan.

23. The method according to claim 17, wherein said radiating source element is characterized by a thermal time constant at an operating temperature consistent with operating requirements of the spectrometer and said power supply applies a periodic voltage across said radiating source element at a frequency greater than the inverse of said thermal time constant.

24. The method according to claim 23, wherein said periodic voltage is a voltage of constant amplitude and frequency across said radiating source element at a frequency greater than the inverse of said thermal time constant.

25. The method according to claim 23, wherein said periodic voltage is an AC square wave voltage across said radiating source element at a frequency greater than the inverse of said thermal time constant.

26. The method according to claim 17, wherein
said power supply is a class E amplifier.

27. The method according to claim 26, wherein said class E amplifier provides an approximately constant power output.

* * * * *